United States Patent
Joubert et al.

(10) Patent No.: US 10,291,588 B2
(45) Date of Patent: May 14, 2019

(54) SECURE REGISTRATION TO A SERVICE PROVIDED BY A WEB SERVER

(75) Inventors: Eric Joubert, Nozay (FR); Monique Lu, Nozay (FR)

(73) Assignee: Alcatel Lucent, Paris (FR)

( * ) Notice: Subject to any disclaimer, the term of this patent is extended or adjusted under 35 U.S.C. 154(b) by 848 days.

(21) Appl. No.: 13/821,440

(22) PCT Filed: Sep. 14, 2011

(86) PCT No.: PCT/EP2011/065914
§ 371 (c)(1),
(2), (4) Date: Apr. 2, 2013

(87) PCT Pub. No.: WO2012/035051
PCT Pub. Date: Mar. 22, 2012

(65) Prior Publication Data
US 2013/0179683 A1    Jul. 11, 2013

(30) Foreign Application Priority Data
Sep. 15, 2010  (FR) ..................... 10 57352

(51) Int. Cl.
*H04L 29/06*   (2006.01)
*G06F 21/36*   (2013.01)
(Continued)

(52) U.S. Cl.
CPC .......... *H04L 63/0428* (2013.01); *G06F 21/36* (2013.01); *H04L 9/002* (2013.01);
(Continued)

(58) Field of Classification Search
CPC ............. H04L 63/0428; H04L 63/0478; H04L 63/0876; G06F 21/36
(Continued)

(56) References Cited

U.S. PATENT DOCUMENTS

| 7,366,701 B2 | 4/2008 | Bramhill et al. |
| 8,112,483 B1 * | 2/2012 | Emigh et al. ............ 709/206 |

(Continued)

FOREIGN PATENT DOCUMENTS

| CN | 1744123 | 3/2006 |
| CN | 1845489 | 10/2006 |

(Continued)

OTHER PUBLICATIONS

Judd, Christopher M., Joseph Faisal Nusairat, and James Shingler. "Security in Grails." Beginning Groovy and Grails: From Novice to Professional (2008): 215-256.*

(Continued)

*Primary Examiner* — John B King
*Assistant Examiner* — Carlos E Amorin
(74) *Attorney, Agent, or Firm* — McCracken & Gillen LLC

(57) ABSTRACT

A technique is provided for controlling a secure registration for a service provided by a web server from a communication terminal in a telecommunications network. The technique includes a web server that saves a dynamically generated code matching the terminal's IP address and transmits a message containing the code to an e-mail address. This address is provided by the user in response to the terminal's connection to the web server. The server transmits to the terminal an application capable of generating an automated test to tell computers apart from humans. The answer provided by the user is encrypted with the terminal's IP address and the code contained in the message transmitted to the e-mail address, and is directly transmitted by the application to the server, which decrypts it and compares it with an expected answer to enable access to the web server if the decrypted answer matches the expected answer.

15 Claims, 2 Drawing Sheets

(51) Int. Cl.
*H04L 9/32* (2006.01)
*H04L 9/00* (2006.01)

(52) U.S. Cl.
CPC ........ *H04L 9/3271* (2013.01); *H04L 63/0876* (2013.01); *G06F 2221/2129* (2013.01); *G06F 2221/2133* (2013.01)

(58) Field of Classification Search
USPC ........................................................ 713/162
See application file for complete search history.

(56) References Cited

U.S. PATENT DOCUMENTS

| | | | | |
|---|---|---|---|---|
| 8,209,743 | B1* | 6/2012 | Frank | ................................ 726/2 |
| 2005/0281470 | A1* | 12/2005 | Adams | .......................... 382/232 |
| 2007/0067833 | A1* | 3/2007 | Colnot | .................. H04L 9/3271 |
| | | | | 726/9 |
| 2009/0150983 | A1 | 6/2009 | Saxena et al. | |
| 2009/0208002 | A1 | 8/2009 | Koehane et al. | |
| 2010/0077215 | A1 | 3/2010 | Placin | |
| 2010/0088399 | A1* | 4/2010 | Gluck | ........................... 709/221 |
| 2010/0162404 | A1* | 6/2010 | Dawson | ................ G06F 21/552 |
| | | | | 726/26 |
| 2011/0029902 | A1* | 2/2011 | Bailey | ........................... 715/764 |
| 2011/0131638 | A1* | 6/2011 | Kan | .................................. 726/6 |
| 2011/0150267 | A1* | 6/2011 | Snelling | ................ G06F 21/316 |
| | | | | 382/100 |
| 2013/0124425 | A1* | 5/2013 | Agrawal | ......................... 705/75 |

FOREIGN PATENT DOCUMENTS

| | | |
|---|---|---|
| CN | 101388078 | 3/2009 |
| EP | 1845468 | 10/2007 |

OTHER PUBLICATIONS

Phil Hack; Better CAPTCHA Through Encryption; Internet Citation; Feb. 10, 2006; pp. 1-16; ;XP007918095; URL: http://haacked.com/archive/2006/10/02/Better_CAPTCHA_Through_Encryption.aspx; Retrieved Apr. 5, 2011.

First Examination Report (FER) in related Indian Application No. 2130/CHENP/2013 dated Feb. 28, 2019.

\* cited by examiner

SECURE REGISTRATION TO A SERVICE PROVIDED BY A WEB SERVER

FIELD OF THE INVENTION

The present invention pertains to an access control method in the context of a telecommunications network, and more particularly to controlling an identification process by a test intended to tell humans apart from computers in order to register for a service provided by a server within a telecommunications network.

BACKGROUND

In order to register for a service delivered by a server, a user may be asked to pass a test in order to prevent robots from registering automatically. Such a test may be a "captcha" (Acronym of "Completely Automated Public Turing test to Tell Computers and Humans Apart") test, which is an automated "Turing" test to distinguish computers from humans. More specifically, such a test may ask a human to decipher a short fragment of text whose image is distorted and contaminated with graphical noise.

Different types of "captcha" tests have been developed, for example using questions about images or hard-to-read text. However, hackers have developed tools to pass such tests automatically, such as by using text recognition tools, "speech to text" conversion tools, and image recognition algorithms.

Currently, there are three types of hacks that can be used to trick "captcha" tests:
  solving by automatic robots,
  solving by humans paid for that purpose,
  solving by a human who is working unintentionally by means of a hacker site that secretly uses the user by redirecting to that person a "captcha" test for him or her to solve.

In the last situation, the user solves a "captcha" test without knowing that he or she is providing an answer to a hacker site that may then use that answer to register with a service delivered by a server.

There is a need to counter this sort of attack performed by means of a hacker site, which is located between the terminal of a user and a server to which the terminal is connected, and which can intercept communications between the terminal and the server.

SUMMARY

One purpose of the invention is particularly to propose a system to ensure secure registration for a service provided by a web server, the system being capable of preventing third parties from intercepting answers to tests aimed at telling humans apart from computers, sent by users to register with said service.

In order to achieve this purpose, a method for controlling secure registration with a service provided by a web server from a communication terminal in a telecommunications network comprises the following steps:
  in response to a connection by the communication terminal to the Web server that prompted the user to provide an email address, saving a dynamically generated code as a match for the IP address of the communication terminal and transmitting a message containing the code to the email address provided by the user,
  transmitting an application to the communication terminal, which automatically installs the received application, the application being capable of generating an automated test to distinguish computers from humans and also capable of transmitting an answer to the test directly to the Web server,
  decrypting an answer provided by the user to a test generated by the application and transmitted from the communication terminal, the answer being encrypted with the IP address of the communication terminal and the code contained within the message transmitted to the email address provided by the user, and
  comparing the decrypted answer with an expected answer in order to allow access to the Web server by the user if the decrypted answer matches the expected answer.

Advantageously, the invention offers a solution to avoid hacks that would make it possible to trick "captcha" tests by means of a hacker site that secretly uses the user by redirecting a "captcha" test to that user for him or her to solve. Thus, the Web server is assured that the user solving the "captcha" test is indeed the user who To the website in order to access its service.

According to another characteristic of the invention, the application may be in the form of program instructions that may be executed by a web browser of the communication terminal. The application is thereby built into the browser, which allows the user's answer to be directly transmitted to the Web server.

According to another characteristic of the invention, the test generated by the application may be a "captcha" test.

According to another characteristic of the invention, the Web server may dynamically produce parameters for said test provided by the application and may transmit the application, including the parameters, to the communication terminal.

According to another characteristic of the invention, the Web server may save an expected answer as a match with the IP address of the communication terminal, the expected answer depending on the parameters produced.

According to another characteristic of the invention, the Web server may transmit a message to the communication terminal in order to inform the user that a message was transmitted to the email address provided by the user.

According to another characteristic of the invention, the Web server may additionally verify that said answer was transmitted from the same IP address as had previously been memorized as a match for the generated code.

The invention also pertains to a Web server for securely registering for a service provided by the Web server from a communication terminal in a telecommunications network, the Web server comprising:
  means for saving a dynamically generated code as a match for the IP address of the communication terminal and transmitting a message containing the code to the email address provided by the user, in response to a connection by the communication terminal to the Web server that prompted the user to provide the email address.
  means for transmitting an application to the communication terminal which automatically installs the received application, the application being capable of generating an automated test to distinguish computers from humans and capable of transmitting an answer to the test directly to the Web server,
  means for decrypting an answer provided by the user to a test generated by the application and transmitted from the communication terminal, the answer being encrypted with the IP address of the communication terminal and the code contained within the message transmitted to the email address provided by the user, and means for comparing the decrypted answer with an expected answer in order to allow access to the Web server by the user if the decrypted answer matches the expected answer.

The invention also pertains to a computer program capable of being implemented within a server, said program comprising instructions which, whenever the program is executed within said server, carry out the steps according to the inventive method.

The present invention and the benefits thereof shall be better understood upon examining the description below, which makes reference to the attached figures, in which:

DETAILED DESCRIPTION

Figure 1:
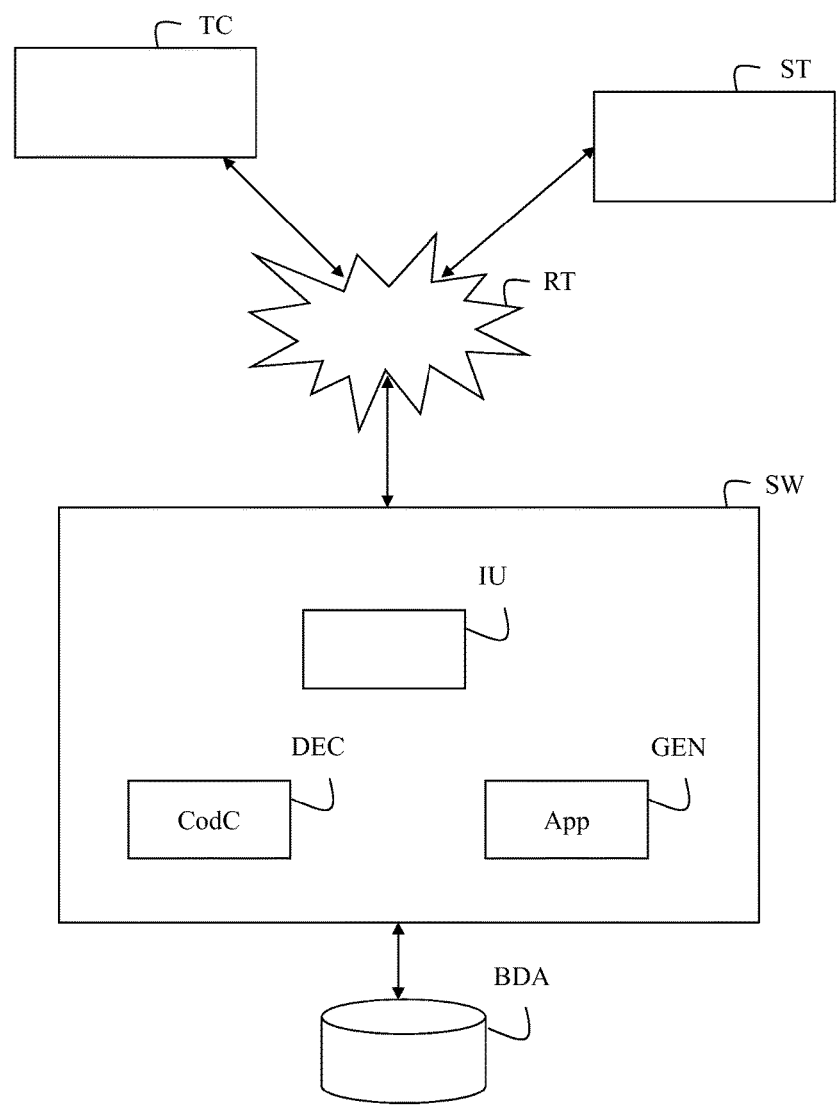
FIG. 1 is a schematic block diagram of a communication system according to one embodiment of the invention.

With reference to FIG. 1, a communication system comprises at least one Web server SW and one communication terminal TC, and potentially one third-party server ST, capable of communicating with one another over a communications network RT.

The telecommunication network RT may be a wired or wireless network, or a combination of wired and wireless networks.

In one example, the telecommunications network RT is a high-speed IP ("Internet Protocol") packet network, such as the Internet or an intranet.

In one example, a communication terminal TC is a personal computer directly linked by modem to an xDSL ("Digital Subscriber Line") or ISDN ("Integrated Services Digital Network") link connected to the telecommunication network RT.

In another example, a communication terminal TC is a mobile cellular radiocommunication terminal, linked to the telecommunication network by a radiocommunication channel, for example of the GSM ("Global System for Mobile communications") or UMTS ("Universal Mobile Telecommunications System") type.

In another example, a communication terminal TC comprises an electronic telecommunication device or object that may be a personal digital assistant (PDA) or a smartphone, capable of being connected to an access terminal of a short-range public wireless local area network WLAN, a network using the 802.1x standard, or a medium-range network using the WIMAX ("World wide Interoperability Microwave Access") protocol, connected to the telecommunication network.

The Web server SW posts one or more websites, such as an online sales site or a site to register for online payment.

The Web server SW comprises a generation module GEN, a decoding module DEC, and a user interface IU.

In the remainder of the description, the term module may designate a device, a software program, or a combination of computer hardware and software, configured to execute at least one particular task.

The web server SW is connected to an authentication database BDA, which is integrated into the server SW or incorporated into a database management server connected to the server SW by a local or remote link.

In particular, the authentication database BDA contains information about the user that makes it possible to authenticate him or her, as well as the answer expected by the server when that user registers.

The generation module GEN provides a test application App of the "captcha" type and dynamically generates a test. More particularly, the application App is in the form of program instructions that can be executed by a web browser, and the generated test may be interpreted by the application executed by the browser in order to present a question to the user.

For example, when the user makes a registration request to the site hosted by the Web server SW, the module GEN automatically transmits the application to the terminal TC, which automatically, or optionally with the users agreement, installs the application, which is then managed by the browser by means of which the user is directly connected to the website. In other words, the application App may be considered a "plug-in" of the web browser.

The decoding module DEC saves the IP address ("Internet Protocol") of the user's terminal TC and an email address provided by the user in the database BDA. The decoding module DEC also saves an encryption code CodC and the expected answer to the test generated by the module GEN in the database BDA.

The decoding module DEC receives the user's answer to the test proposed by the application App, and verifies that the answer was transmitted from the same IP address as the one previously saved. The module DEC compares the received answer with the expected answer saved in the database BDA.

Optionally, the decoding module DEC verifies a wait time between the moment when the user registered to the website and the moment when the user transmitted an answer to the test proposed by the application. For example, this wait time may be two or three minutes, taking into account the estimated time needed for the user to receive the email that comprises the encryption code CodC and solve the "captcha" test.

The user interface IU enables a user to enter his or her contact information, e.g. to register with the website. In particular, the user is prompted to enter an email address to which the Web server may transmit the encryption code.

The third-party server ST is a server managed by a hacker for the purpose of intercepting communications between the communication terminal TC and the Web server SW.

Figure 2:
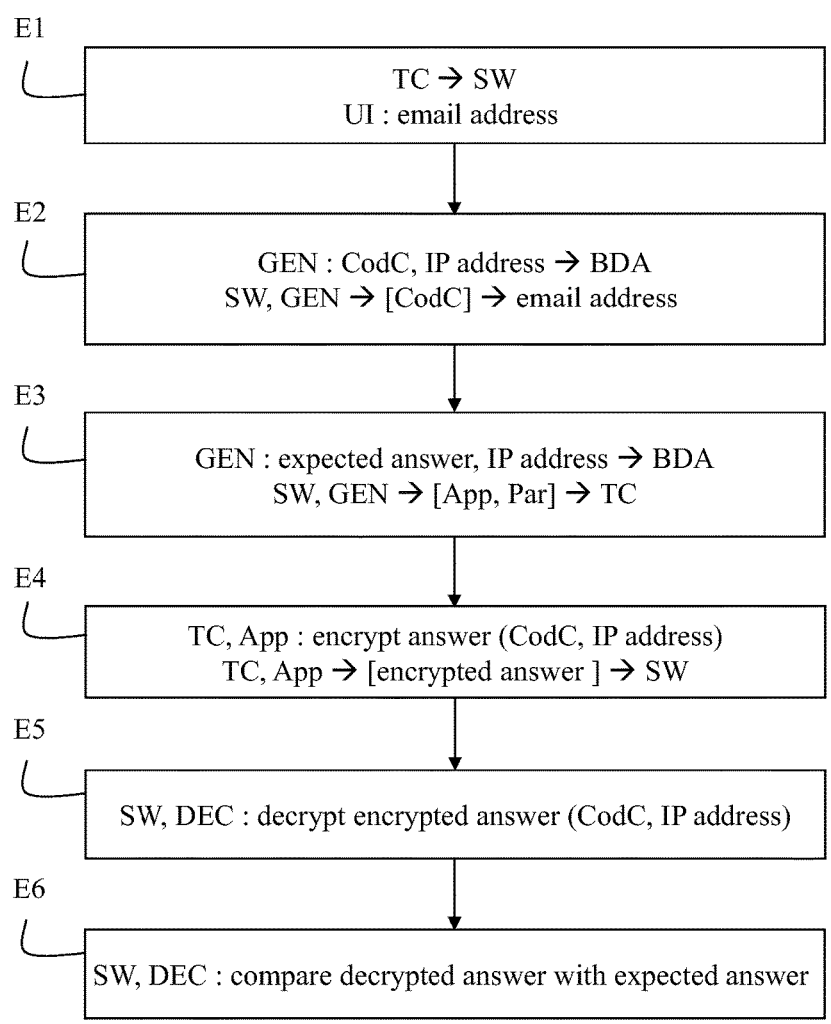
FIG. 2 is an algorithm of the method for controlling secure communications between a terminal in a server according to one embodiment of the invention.

With reference to FIG. 2, a method for controlling a secure registration for a service provided by a Web server from a communication terminal according to one embodiment of the invention comprises steps E1 to E6 executed within the communication system.

In step E1, the user connects to the website hosted by the Web server SW via the communication terminal TC.

For example, the user wishes to register with the website in order to enjoy the service offered by the website.

Via the user interface UI, the website prompts the user to enter his or her contact information, and particularly an email address.

The decoding module DEC saves the IP address of the user's terminal TC and the email address provided by the user into the database BDA.

In step E2, the generation module GEN dynamically generates an encryption code CodC and saves it in the database BDA as a match for the user's IP address. The generation module GEN sends a message containing the encryption code CodC to the email address provided by the user.

In step E3, the generation module GEN dynamically produces parameters Par for a "captcha" test and saves an expected answer for that test in the database BDA as a match for the user's IP address, the expected answer depending on the parameters produced. The generation module GEN transmits an application App including the parameters Par generated for a "captcha" test to the communication terminal TC.

The generation module GEN further transmits a message the terminal TC in order to inform the user that the message has been transmitted to the email address provided by the user. This information may be provided to the user at the end of step E2 or E3.

In step E4, the communication terminal TC automatically installs the received application App, which is then managed by the terminal's web browser.

The user is invited by the installed application App to check his or her email in order to retrieve the encryption code CodC included in a received message. The user indicates his or her access identity to the service, his or her corresponding password, and is also prompted to solve a "captcha" test generated by the application App by means of the parameters Par transmitted with the application.

The application App encrypts the answer provided by the user with the IP address of the terminal TC and the encryption code CodC that is provided by the user after having been retrieved in the email. The application App transmits the encrypted answer directly to the web server SW, with the application having the exact destination address of the web server and the answer being unsendable to a third-party server. In particular, the address of the service where the answer must be sent, located on the web server, is "hard-coded" in the application. As a result, the application does not return the answer to the entity that provided the application (which might be a hacker site if that site had first "capture" that application) but rather "directly" returns the answer to the destination service on the web server.

In step E5, the decoding module DEC verifies that the encrypted answer was transmitted from the same IP address as the one previously saved as a match with the generated code CodC. The decoding module DEC decrypts the encrypted answer with the IP address and encryption code CodC saved in the database BDA.

In step E6, the decoding module DEC compares the decrypted answer with the expected answer saved in the database BDA.

The web server SW allows the user to register if the decrypted answer is the same as the expected answer.

Optionally, the decoding module DEC verifies a wait time between the moment when the user registered to the website and the moment when the user transmitted an answer to the test proposed by the application. If the wait time exceeds a predefined interval of time, SW does not allow the user to register.

Thus, a hacker, by means of a third-party server ST, attempts to intercept communications between the communication terminal TC and the web server SW. He or she must be the origin of the request to the web server SW. If the hacker does not change his or her IP address, the web server SW will not accept the solution it has received, because the IP address used to encrypt the solution to the test (the user's IP address) will not match the IP address used by the web server SW to decrypt the solution (the hacker's IP address).

Additionally, in the event that the hacker changes his or her IP address and replaces it with the user's, for example when the user connects to the web server SW, the execution of the application App for transmitting the solution to the test enables a direct dialog between the user and the web server without going through the hacker's third-party server. This is because the destination of the answer containing the solution is encrypted by the application and the hacker cannot intercept the answer.

Owing to the CodC code transmitted to the user, a human action is required to read the e-mail containing said code. Additionally, said code is used with the user's IP address to encrypt the solution to the "captcha" test. Thus, if a person is spying on the user to find the solution, that solution cannot be reused because the code and IP address are unknown to that person.

The invention described here pertains to a method and web server for controlling a secure registration for a service provided by the web server from a communication terminal. According to one embodiment of the invention, the steps of the inventive method are determined by the instructions of a computer program incorporated into a server, such as the web server SW. The program comprises program instructions that, when said program is loaded and executed within the server, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method for controlling a secure registration for a service provided by a web server from a communication terminal in a telecommunications network, comprising: in response to a connection by the communication terminal to the web server that prompted a user to provide an email address, saving, at the web server, a dynamically generated code associated with an Internet Protocol (IP) address of the communication terminal and transmitting a message containing the code to the email address provided by the user; automatically transmitting, at the web server, an application to the communication terminal that automatically installs the application, the application being capable of generating an automated test to distinguish computers from humans and capable of transmitting an answer to the test directly to the web server; decrypting, at the web server, an answer provided by the user to a test generated by the application and received from the communication terminal, the answer being encrypted with the IP address of the communication terminal and the code contained within the message transmitted to the email address provided by the user; and comparing, at the web server, the decrypted answer with an expected answer to allow the user access to the web server on a condition that the decrypted answer matches the expected answer.

2. The method according to claim 1, wherein the application is in a form of program instructions that can be executed by a web browser of the communication terminal.

3. The method according to claim 1, wherein the test generated by the application is a Completely Automated Public Turing test to Tell Computers and Humans Apart (CAPTCHA) test.

4. The method according to claim 1, further comprising dynamically producing, at the web server, parameters for the test provided by the application and transmitting the application including the parameters to the communication terminal.

5. The method according to claim 4, further comprising saving, at the web server, an expected answer as associated with the IP address of the communication terminal, with the expected answer depending on the parameters produced.

6. The method according to claim 1, further comprising transmitting, at the web server, a message to the communication terminal to inform the user that a message was transmitted to the e-mail address provided by the user.

7. The method according to claim 1, further comprising verifying, at the web server, that the answer was transmitted from the same IP address as was previously saved as associated with the generated code.

8. The method according to claim 1, further comprising verifying a wait time between a first time when the user registered to the web server and a second time when the user transmitted the answer to the test.

9. The method according to claim 8, further comprising denying the user access to the web server on a condition that the wait time exceeds a predefined interval of time.

10. The method according to claim 8, wherein the wait time is at least 2 minutes.

11. The method according to claim 1, wherein the communication terminal comprises a mobile terminal or a smartphone and the telecommunication network is a wireless network.

12. The method according to claim 1, wherein the web server posts an online sales site.

13. The method according to claim 1, wherein the web server posts a site to register for online payments.

14. The method according to claim 1, wherein the communication terminal comprises a personal computer directly linked by modem to a Digital Subscriber Line or an Integrated Services Digital Network link connected to the telecommunication network.

15. A non-transitory computer readable medium having computer executable instructions encoded therein, said computer readable instructions capable of being executed in a web server to control a secure registration for a service provided by a web server from a communication terminal in a telecommunications network, comprising: in response to a connection by the communication terminal to the web server that prompted a user to provide an email address, saving, at the web server, a dynamically generated code associated with an Internet Protocol (IP) address of the communication terminal and transmitting a message containing the code to the email address provided by the user; automatically transmitting, at the web server, an application to the communication terminal that automatically installs the application, the application being capable of generating an automated test to distinguish computers from humans and capable of transmitting an answer to the test directly to the web server; decrypting, at the web server, an answer provided by the user to a test generated by the application and received from the communication terminal, the answer being encrypted with the IP address of the communication terminal and the code contained within the message transmitted to the email address provided by the user; and comparing, at the web server, the decrypted answer with an expected answer to allow the user access to the web server on a condition that the decrypted answer matches the expected answer.

* * * * *